(12) United States Patent
Chapman et al.

(10) Patent No.: US 8,706,606 B2
(45) Date of Patent: Apr. 22, 2014

(54) AUTOMATED TRADING SYSTEM

(75) Inventors: Matthew Chapman, Coogee (AU); Matthew John Hurd, Duffys Forest (AU)

(73) Assignee: Zomojo Pty Ltd, Sydney (AU)

( * ) Notice: Subject to any disclaimer, the term of this patent is extended or adjusted under 35 U.S.C. 154(b) by 54 days.

(21) Appl. No.: 13/128,621

(22) PCT Filed: Jul. 2, 2009

(86) PCT No.: PCT/AU2009/000849
§ 371 (c)(1),
(2), (4) Date: Jul. 11, 2011

(87) PCT Pub. No.: WO2010/051575
PCT Pub. Date: May 14, 2010

(65) Prior Publication Data
US 2011/0264578 A1    Oct. 27, 2011

(30) Foreign Application Priority Data

Nov. 10, 2008   (AU) ................................ 2008905788

(51) Int. Cl.
*G06Q 40/00* (2012.01)
(52) U.S. Cl.
CPC ................ *C06Q 40/00* (2013.01); *C06Q 10/10* (2013.01)
USPC .......................................................... 705/37

(58) Field of Classification Search
CPC .............................. G06Q 40/40; G06Q 10/10
USPC ............................................................ 705/37
See application file for complete search history.

(56) References Cited

U.S. PATENT DOCUMENTS

| | | | | |
|---|---|---|---|---|
| 4,903,201 A | * | 2/1990 | Wagner | 705/37 |
| 7,110,981 B1 | * | 9/2006 | Sidikman et al. | 705/43 |
| 7,130,823 B1 | * | 10/2006 | Rayner et al. | 705/37 |
| 7,251,629 B1 | * | 7/2007 | Marynowski et al. | 705/37 |
| 7,356,499 B1 | * | 4/2008 | Amburn | 705/37 |
| 2002/0128945 A1 | * | 9/2002 | Moss et al. | 705/37 |
| 2002/0156722 A1 | * | 10/2002 | Greenwood | 705/37 |
| 2003/0018561 A1 | * | 1/2003 | Kitchen et al. | 705/37 |
| 2004/0024689 A1 | * | 2/2004 | Zhou et al. | 705/37 |
| 2004/0148242 A1 | * | 7/2004 | Liu | 705/37 |
| 2005/0228741 A1 | | 10/2005 | Leibowitz | |
| 2005/0283427 A1 | * | 12/2005 | Owens et al. | 705/37 |
| 2008/0243675 A1 | * | 10/2008 | Parsons et al. | 705/37 |
| 2008/0262959 A1 | | 10/2008 | Tupper et al. | |
| 2010/0057600 A1 | * | 3/2010 | Johansen et al. | 705/37 |

\* cited by examiner

*Primary Examiner* — Kirsten Apple
*Assistant Examiner* — Joan Goodbody
(74) *Attorney, Agent, or Firm* — Kelly & Kelley, LLP

(57) ABSTRACT

A communication interface (1) for an Automated Trading System is disclosed. The communications interface (1) has dedicated hardware (1) array to process messages (4) between an external network (2) and a matching engine (3) in the automated trading system.

22 Claims, 3 Drawing Sheets

AUTOMATED TRADING SYSTEM

FIELD OF THE INVENTION

The present invention relates generally to improvements in automated trading systems for market trading, and, particularly, but not exclusively, to a communications interface for an automated trading system.

BACKGROUND OF THE INVENTION

Automated trading systems (ATS) are known for facilitating real time matching of buyers and sellers in a marketplace, where one or more listed instruments (such as stocks, securities, etc.) are traded.

Current ATS's utilize an Electronic Communication Network (ECN). The ECN implements a Central Limited Order Book (CLOB) which comprises a standard double auction between sellers who wish to sell a financial instrument at a particular price and buyers who wish to buy one or more financial instruments at a particular price.

In major trading markets, such as Nasdaq, ASX, and others, powerful computing systems are required to implement the many trades that are carried out, during trading.

The speed of the computing systems is very important. There are two important factors in executing a trade, these are Price Priority and Time Priority. Price Priority means that the person who wishes to sell at the best price or who wishes to buy at the best price will be given priority in trade. Time Priority means that where there are two sellers or two buyers at the same price then the trade will be executed to the first of the buyers or sellers whose order reaches the CLOB first and is executed first. Speed of processing of the ECN is therefore critical.

Clients of the ECN electronically submit orders to buy or sell a particular quantity of a listed instrument, with particular conditions such as a maximum/minimum price. These orders are placed in a queue. Initially, the client is notified that their order has been confirmed.

When a buyer and seller are found that can be matched together, satisfying their price conditions, a trade occurs. The buyer and seller are both notified that their orders have successfully been executed.

An anonymised summary of order prices and trades ("market data") is also disseminated to other interested clients.

Metrics of ECN performance include latency and throughput. Latency is the response time of the exchange. This can be measured in a number of different contexts: from placing an order to receiving an initial confirmation, from placing an order to receiving an execution notification, or from placing an order to it being disseminated in the market data. Throughput is the maximum number of orders or trades per second that the ECN can support.

Many clients of ECN's desire low latency and high throughput, so that they can trade frequently and confidently, having less uncertainty about the status of their orders and being able to respond rapidly to changing conditions.

Current ECN's are implemented in software on general-purpose processor architectures, and typically with general-purpose operating systems. While this simplifies implementation, these solutions exhibit high latencies—in the hundreds of microseconds at best, and typically milliseconds. When a general-purpose operating system is used, this also increases the chance that a hostile attacker could compromise the computer running the ECN software; for this reason an additional firewall system is often added between the client and the ECN system, further increasing latency.

SUMMARY OF THE INVENTION

In accordance with a first aspect, the present invention provides a communications interface for an Automated Trading System, the communications interface being arranged for communication of messages to and from an external network, the communications interface comprising external network facing dedicated hardware which is arranged to receive messages directly from the external network, and comprises a parsing engine implemented in dedicated hardware and arranged to process the messages for transmission to a matching engine in the automated trading system.

In an embodiment, the dedicated hardware is a programmable logic device (PLD) programmed for processing of the financial transaction messages. In an embodiment, the dedicated hardware is implemented by a Programmable Gate Array (PGA), in an embodiment a Field Programmable Gate Array (FPGA).

In an embodiment, the use of dedicated hardware advantageously may be able to process incoming and outgoing messages at hardware speeds, increasing the overall speed of the automated trading system, which in one implementation is an electronic communications network (ECN).

In an embodiment, the dedicated hardware arrangement implements a parsing and validation engine arranged to convert incoming messages (e.g. orders from brokers) into a request format which in an embodiment is simpler, and is appropriate for the matching engine.

In an embodiment, the dedicated hardware is arranged to implement a notification engine for receiving transaction information from the matching engine and composing appropriate messages for sending outwards onto the network.

In an embodiment, the dedicated hardware is arranged to implement a security function, and it is arranged to check that incoming messages are genuine. In an embodiment, security function, is implemented by implementing a check summing check of the incoming messages, which utilize specific exchange protocols.

Using dedicated hardware processes advantageously facilitates very high data throughput with low latency. Further, hardware such as PLD's can be interfaced to networks relatively easily. By placing the PLD as the client facing part of an ECN, high bandwidth and low latency communication with clients can be realized. Additionally, in an embodiment, since APLD has a very minimal and verifiable networking implementation, the attack surface exposed to would be attackers is minimal, subsuming the function of a firewall.

In an embodiment, redundancy is provided by providing a further communications interface and a further matching engine, the further communications interface and communications interface being connected. In an embodiment, the further communications interface and communications interface are connected by a serial connection. In an embodiment, yet a further communications interface and matching engine is provided, to provide further redundancy. The further communications interface is connected to the other communications interfaces, in an embodiment by a serial connection.

In an embodiment, a matching engine may also be implemented by dedicated hardware. In an embodiment, the matching engine may be implemented by a PLD and, in an embodiment, by a FPGA.

In accordance with a second aspect, the present invention provides a method of handling communications between an automated trading system and an external network, comprising the steps of:

directly receiving messages from the external network at hardware or close to hardware speeds, and processing the messages, including the step of parsing the messages, at hardware or close to hardware speeds, for transmission to a matching engine in the automated trading system.

In an embodiment, processing is carried out by a dedicated hardware arrangement, which may be implemented by a programmable logic device (PLD).

In accordance with a third aspect, the present invention provides a matching engine for an automated trading system, the matching engine comprising dedicated hardware arranged to execute a standard double auction process for trading of instruments.

In an embodiment, the dedicated hardware is a programmable logic device (PLD). In an embodiment, the dedicated hardware is a Field Programmable Gate Array (FPGA).

In accordance with a fourth aspect, the present invention provides a security arrangement for an automated trading system, the security arrangement comprising a communications interface arranged to receive incoming messages to the automated trading system from an external network, and including dedicated hardware arranged to verify the incoming messages.

In an embodiment, the verification is carried out by a check summing check.

In an embodiment, the dedicated hardware is a Programmable Logic Device (PLD). In an embodiment, the programmable logic device is a Field Programmable Gate Array (FPGA).

BRIEF DESCRIPTION OF THE DRAWINGS

Features and advantages of the present invention will become apparent from the following description of embodiments thereof, by way of example only, with reference to the accompanying drawings, in which.

DETAILED DESCRIPTION OF EMBODIMENTS

Figure 1:
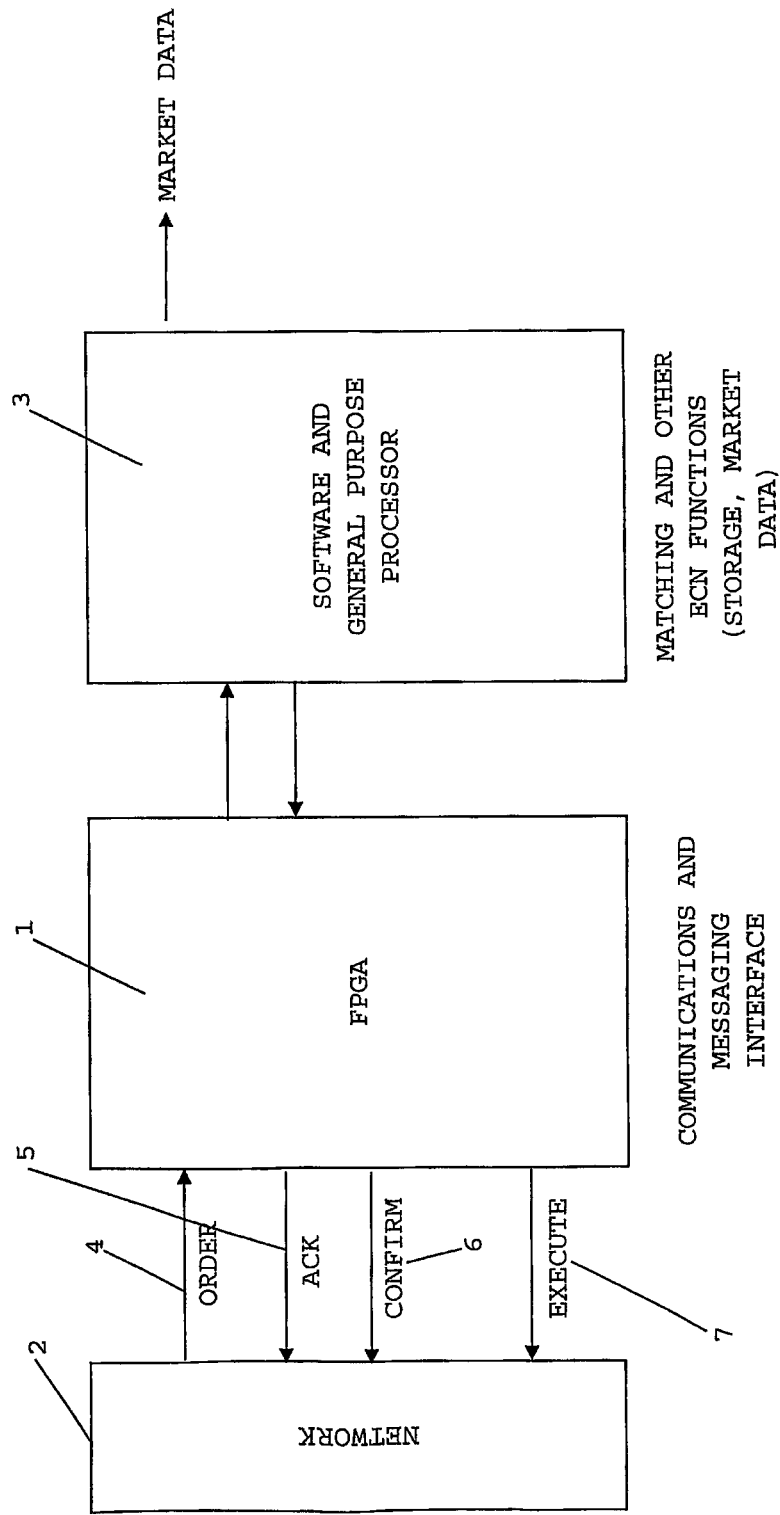
FIG. 1 is a high level block diagram of an automated trading system incorporating an apparatus in accordance with an embodiment of the present invention.

Referring to FIG. 1, a communications interface, designated by reference numeral 1, for an automated trading system is illustrated. Communications interface 1 is implemented in dedicated hardware, in this example being in the form of a field programmable gate array 1 (FPGA), which is programmed to provide an interface between an external network 2 and a matching engine 3, which, in this example, is implemented by software on a general purpose processors (e.g. a general purpose server and computer programme to implement a standard double auction for market trading).

Together the communications and messaging interface 1 implemented by the FPGA and the matching engine implemented by the general purpose processing system and software, constitute a Electronic Communications Network (ECN) implementing an Automated Trading System (ATS).

The function of the communications and messaging interface 1, is to receive messages from the network 2, process them and hand them on to the matching engine 3. It also has the function of receiving messages from the matching engine 3, processing them and handing them back to the network 2.

Clients of the ECN e.g. brokers, traders and the like submit orders to buy or sell a particular quantity of a listed instrument e.g. a stock or security. These are submitted as ORDER messages 4. The ORDER message will usually be of known format according to the particular trading exchange. A typical format for an ORDER message 4 will be described in more detail later.

In response to receiving an ORDER 4, an ECN will usually provide an acknowledgement, ACK 5, acknowledging that the ECN has received the ORDER 4. Further, a CONFIRM message 6 will be provided by the ECN when the order has been processed and passed onto the matching engine for inclusion in the standard double auction trading process.

When a trade has occurred, i.e. when the matching engine has matched a buy with a sell and therefore executed a trade, an EXECUTE message 7 is passed back to the external network 2 so that the client is advised of the trade. When a trade has occurred, the buyer and seller are both notified by an EXECUTE message 7 that their orders have been successfully executed.

The response time of the ECN is an important measure of performance. This includes the response time for providing an ACK 5 and also the response time for providing a CONFIRM 6. A measure can also be the time from placing an order to receiving an EXECUTE 7.

As discussed earlier, current ECN's run on general purpose processors using typical software. These current solutions exhibit high latencies, in the hundreds of microseconds at best, and typically milliseconds. In an area where time is critical (literally "time is money") such latencies require improvement.

In this embodiment, the FPGA 1 is connected to the network 2 (such as Ethernet) either directly or via one or more physical layer transceivers. In this embodiment, high end PLD's, such as Virtex 5 FPGA's from Xilinx are utilized to provide very high data throughput with low latency. The applicants have found that by placing the PLD as the client-facing part of an ECN, high bandwidth and low latency communication with clients can be realized.

As well as communications and matching, the embodiment of FIG. 1 also carries out the other functions of an ECN, such as storage of the processed information and the production of market data from the processed trades.

Figure 2:
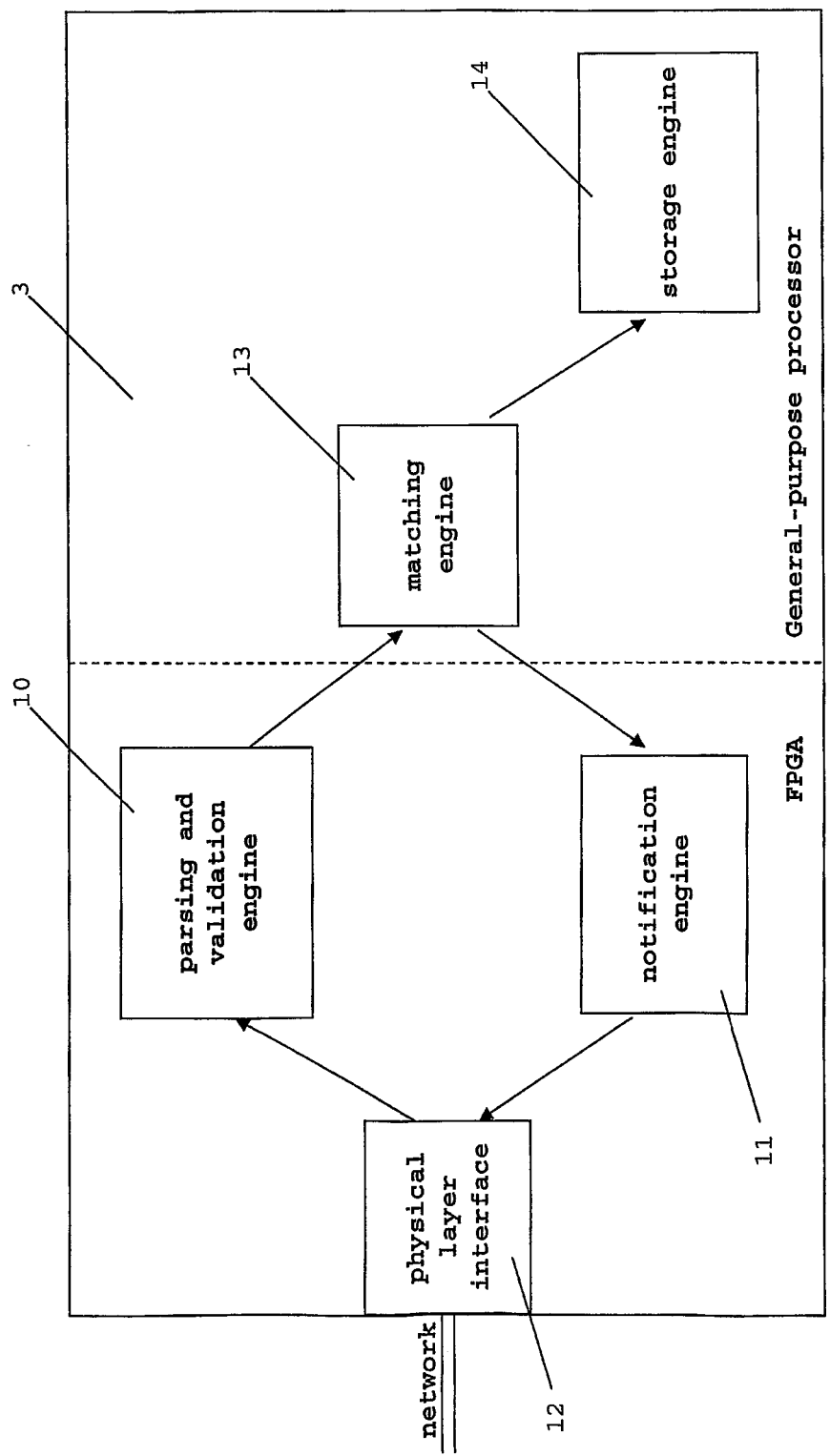
FIG. 2 is a more detailed block diagram of the system of FIG. 1.

FIG. 2 shows the ECN of FIG. 1 in more detail.

The FPGA 1 comprises a parsing and validation engine 10 and a notification engine 11 connected to the network via physical layer interface 12. Clients (such as brokers, etc.) send messages to the ECN system over the network 2. There are different types of messages for operations, such as submitting a new order and modifying a previous order.

The parsing and validation engine 10 converts these messages in to a simpler request format. In this process, it also verifies that the message is from an authorized client and contains legitimate data, e.g. by doing a check sum check. The order is then sent to a matching engine 12 for the requested instrument. In this embodiment, the matching engine is located on a general purpose processor and is implemented by typical software.

The matching engine updates its queues of quotations according to the request.

The matching engine 13 communicates a set of resulting transactions to the notification engine 11 (implemented by FPGA) and also a storage engine 14 (which is also implemented on a general purpose processor using typical software).

The notification engine 11 sends notification messages (e.g. EXECUTE 7) to the requesting client and any other clients that the order may have matched against. It also disseminates market data to other clients.

The storage engine 14 ensures that all transactions are safely stored on disks or other stable storage media.

The use of an FPGA to implement the parsing and validation engine 10 and notification engine 11, results in much lower latency for the ECN and can result in CONFIRM 6 and ACK 5 in very low time periods (in the orders of a few microseconds or less), and also improves executions as the order are got to the matching engine quicker than with conventional systems. EXECUTE 7 messages are also returned quicker.

In this embodiment, the parsing and validation engine 10 and notification engine 11 are implemented by FPGA. That is the communications and messaging interface 1 is implemented by FPGA.

In another embodiment, the matching engine 13 may also be implemented in FPGA (or other programmable or logic device or dedicated hardware), further increasing speed. In another embodiment, the storage engine may also be implemented in dedicated hardware, e.g. PLD's, FPGA's or the like. In general, the functionality of the ECN can be variously divided between the PLD and the general purpose processor, depending on desired tradeoff between performance and the ease of implementation.

The following description is a more detailed description of processing by the FPGA 1 utilising example messages.

Parsing/Validation Email

The parsing/validation engine 10 in the FPGA 1 is designed so as to operate synchronously with network reception. For a Gigabit Ethernet network, an FPGA clock rate of 125 Mhz is desirable, which allows 8 bits (one byte) of data to be received and processed every clock cycle.

There are two types of ECN messages processed by the FPGA 1 in this example: a new order message, and a modify/cancel order message. The ECN messages are encapsulated in standard Internet Protocol (UDP/IP) packets. An example new order message is as follows:

| | |
|---|---|
| Ethernet protocol header | 112 bits/14 bytes |
| IP protocol header | 160 bits/20 bytes (minimum) |
| UDP protocol header | 64 bits/8 bytes |
| Session ID | 16 bits/2 byte |
| Sequence Number | 16 bits/2 bytes |
| Instrument Code | 32 bits/4 bytes |
| Message Type | 8 bits/1 byte (0 = NEW ORDER) |
| Transaction Type | 8 bits/1 byte (0 = buy, 1 = sell) |
| (Reserved for Future Use) | 16 bits/2 bytes |
| Quantity | 16 bits/2 bytes |
| Price | 16 bits/2 bytes |
| Client Reference | 32 bits/4 bytes |

Firstly, the Ethernet, IP and UDP protocol headers are skipped; this is fairly straight-forward, although the IP header can be variable-length.

Then the ECN protocol fields are received.

The first field—the Session ID—is a opaque token that represents the session between a client and the exchange. Utilising this first field, data related to the client can be looked up in a client information array stored in the FPGA. When the Sequence Number field is received, the FPGA then verifies that the sequence number matches the expected sequence number for the client. If this check fails, the rest of the message is ignored and a notification message is immediately returned to the client. Otherwise, the expected sequence number is incremented by one in preparation for the next message, and processing proceeds. The Session ID is transformed into a more compact "client index" identifying the client, and these two fields are otherwise discarded.

The following four bytes indicate the Instrument Code that the message relates to. This might be a stock code such as "MSFT", or some other identifier. The FPGA, using efficient look-up tables (LUTs), determines if the instrument code is valid. If so, it transforms it into a more compact form, namely an instrument index. Such a form makes later processing much more efficient, but this number may only be ephemerally valid, whereas it is desirable for clients to use a standard instrument code.

Other fields in the message convey the Transaction Type (buy or sell), Price, Quantity, and Client Reference (a client-supplied field that is sent to the client in any correspondence about an order). As each of the remaining fields is received, an internal representation is constructed, as per the schema below. Many of the input fields can be passed through verbatim. However, some validation is performed on the fields to ensure that they have reasonable values; for instance, that the Transaction Type is either buy or sell. This minimises the validation that needs to later take place in the matching engine. Some fields, such as the Reserved field, are in the protocol only for future expansion, and can be omitted from the internal form.

Once all of the fields have been received, an internal sequence number is appended. The resulting 16-byte internal record is written to a circular buffer in a memory area that is shared with the matching engine.

| | |
|---|---|
| Client Index | 1 byte |
| Instrument Index | 1 byte |
| Message Type | 1 byte (0 = NEW ORDER) |
| Transaction Type | 1 byte (0 = buy, 1 = sell) |
| Quantity | 2 bytes |
| Price | 2 bytes |
| Client Reference | 4 bytes |
| (Unused) | 2 bytes |
| Internal Sequence Number | 2 bytes |

Similar processing is also applied to the modify/cancel message:

| | |
|---|---|
| Ethernet protocol header | 112 bits/14 bytes |
| IP protocol header | 160 bits/20 bytes |
| UDP protocol header | 64 bits/8 bytes |
| Session ID | 16 bits/2 bytes |
| Sequence Number | 16 bits/2 bytes |
| Instrument | 32 bits/4 bytes |
| Message Type | 8 bits/1 byte (1 = MODIFY/CANCEL ORDER) |
| (Reserved for Future Use) | 8 bits/1 byte |
| New Quantity | 16 bits/2 bytes |
| Order Reference | 32 bits/4 bytes |
| Client Reference | 32 bits/4 bytes |

This message contains similar fields to the new order message and is processed similarly. Instead of the Transaction Type and Price, an Order Reference is used to refer to the order that was placed. This is placed verbatim into the 16-byte internal record, which in this case appears as follows:

| | |
|---|---|
| Client Index | 1 byte |
| Instrument Index | 1 byte |
| Message Type | 1 byte (1 = MODIFY/CANCEL ORDER) |
| (unused) | 1 byte |
| Order Reference | 4 bytes |
| Client Reference | 4 bytes |
| New Quantity | 2 bytes |
| Internal Sequence Number | 2 bytes |

Matching Engine

The matching engine accesses 16-byte records produced by the parsing/validation engine. For each record it reads, it performs the requested updates on its internal queues, and the generates 16-byte records in an output circular buffer (the notification queue). The notification format is described further below.

If the message type is MODIFY/CANCEL ORDER, the matching engine uses the Order Reference to locate an existing order and update its quantity using the New Quantity field. If the order is not located, belongs to a different client, or New Quantity is greater than the previous quantity, a MODIFY-REJECT notification is queued. Otherwise a MODIFY-ACCEPT notification is queued.

If the message type is NEW ORDER, the matching engine checks if the new order can match with a queued order on the opposite side (e.g. for a buy order, it checks the queues of sellers for the instrument). If so, ORDER-EXECUTE notifications are queued for both parties. If the price is too far away from the current market price, an ORDER-REJECT results.

Otherwise, the order is added to a queue and an ORDER-ACCEPT notification is generated.

The notifications follow a simple record format, which is similar to the input format to the matching engine.

| | |
|---|---|
| Client Index | 1 byte |
| Instrument Index | 1 byte |
| Notification Type | 1 byte (0 = ORDER-REJECT, 1 = ORDER-ACCEPT, 2 = ORDER-EXECUTE, 3 = MODIFY-REJECT, 4 = MODIFY-ACCEPT) |
| Transaction Type | 1 byte |
| Quantity | 2 bytes |
| Price | 2 bytes |
| Client Reference | 4 bytes |
| Order Reference | 4 bytes |

Notification Engine

A notification engine in the FPGA reads records from the notification queue and sends messages to clients. The client index is used to index into a client information array, which contains the Ethernet address, IP address and UDP port number to use to contact the client, as well as the next outgoing sequence number. The internal instrument index is mapped back into the 4-byte instrument code used by clients. Other fields are conveyed verbatim.

The outgoing messages are generated by FPGA logic which executes synchronously with network transmission, generating each output byte as required rather than needing a pre-constructed message in memory.

Fields from the notification record are substituted into the outgoing message in appropriate slots. An example of an outgoing message is as follows:

| | |
|---|---|
| Ethernet protocol header | 112 bits/14 bytes |
| IP protocol header | 160 bits/20 bytes |
| UDP protocol header | 64 bits/8 bytes |
| Sequence Number | 16 bits/2 bytes |
| Notification Type | 8 bits/1 byte |
| Transaction Type | 8 bits/1 byte |
| Instrument Code | 32 bits/4 bytes |
| Quantity | 16 bits/2 bytes |
| Price | 16 bits/2 bytes |
| Client Reference | 32 bits/4 bytes |
| Order Reference | 32 bits/4 bytes |

It will be appreciated that the messages included in the above description are examples only, and messages of other formats or other messages may be processed by arrangements in accordance with other embodiments of the present invention.

In an embodiment, a system such as the embodiment described above may be reproduced a number of times in order to effect redundancy. It will be appreciated that redundancy in a system such as this may be important in order to ensure that market trading can continue (in the event of the breakdown of part or whole of the system) and that trading records are maintained.

Figure 3:
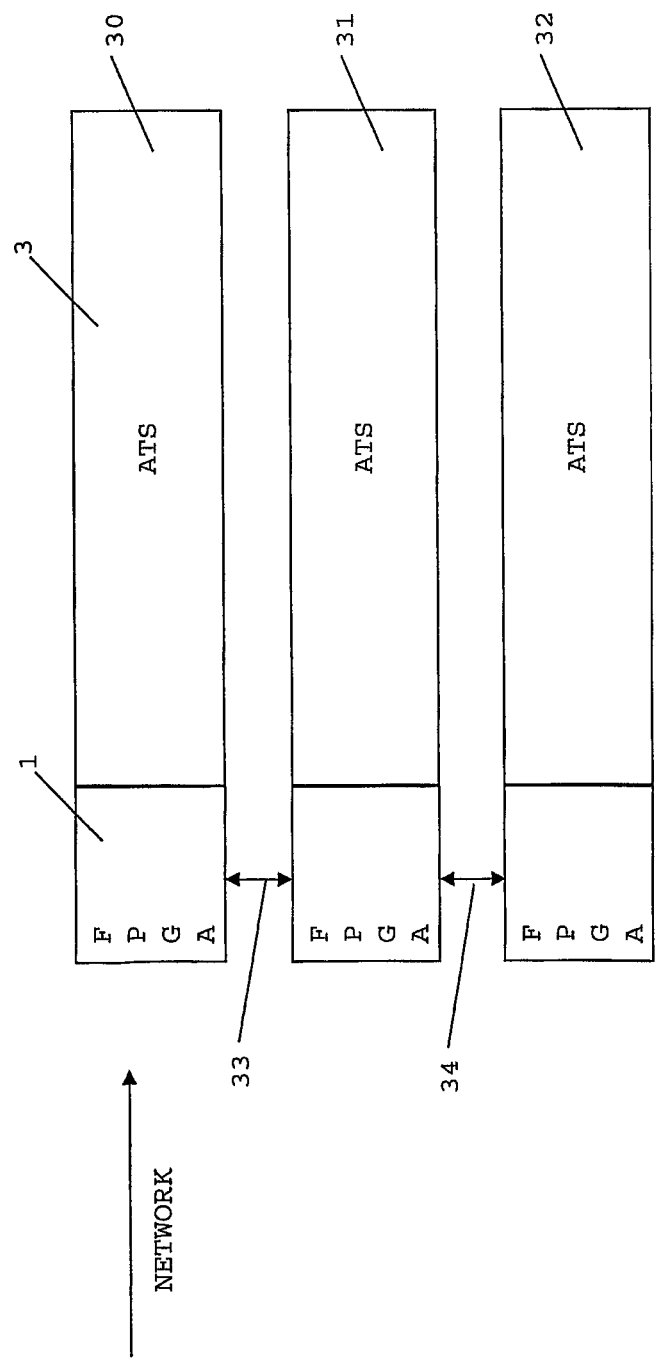
FIG. 3 is a block diagram of an apparatus in accordance with a further embodiment of the invention.

FIG. 3 shows a schematic block diagram of a system in accordance with a further embodiment of the present invention. The system comprises, in this example, three system units 30, 31 and 32. The system units each comprise a communications and messaging interface 1 and a matching engine and arrangement for performing other ECN functions 3. In other words, the system units 30, 31 and 32 are three reproductions of the system of FIG. 1.

In this embodiment, the FPGA's 1 of each system unit 30, 31 and 32 are serially interfaced by connections 33 and 34. This ensures that for all messages coming into and out of the systems, there is a back up system. If system 30 fails, for example, systems 31 and 32 will have all of the information available to continue processing market trading data.

Embodiments such as described above can be used to trade any instrument, including, but not limited to, stocks, securities, currencies, options, futures, bonds, other derivatives, CFD's, commodities, semiconductor chips, and others.

In the above embodiments, the communications interface is implemented by an FPGA. It may be implemented by any programmable logic device, and indeed may be implemented by any dedicated hardware. A customized chip may be used to implement the functionality of the communications interface, for example. Similarly, where other parts of the ECN are implemented using dedicated hardware (e.g. the matching engine and/or storage engine) these also may be implemented using any type of dedicated hardware, such as customized circuits, any PLD's as well as FPGA's.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A communications interface for an Automated Trading System comprising:
   a physical layer interface arranged for communication of messages to and from an external network, the physical layer interface comprising dedicated hardware that faces the external network and is arranged to receive incoming messages directly from the external network, each of the incoming messages comprising a plurality of message fields; and
   a validation engine implemented in the dedicated hardware of the physical layer interface and configured to verify a plurality of the message fields synchronously with reception of the corresponding message fields from the external network, the validation engine configured to verify the plurality of the message fields independently of receiving the entire message.

2. A communications interface in accordance with claim 1, wherein the validation engine is implemented in a dedicated hardware programmable gate array.

3. A communications interface in accordance with claim 1, comprising a parsing engine implemented in the dedicated hardware physical layer interface and configured to synchronously convert the message fields from the incoming messages upon reception of the corresponding message fields into a request format appropriate for a matching engine in the Automated Trading System.

4. A communications interface in accordance with claim 1, comprising a dedicated hardware notification engine arranged to generate notification messages for transmission to a client system through the external network.

5. A communications interface in accordance with claim 4, wherein the notification engine is configured to receive transaction information from a matching engine in the automated trading system and compose messages for sending to the external network synchronously with network transmission.

6. A communications interface in accordance with claim 1, wherein the validation engine is arranged to verify a message sequence number synchronously with reception of a sequence number field for new messages, the validation engine being arranged to compare the message sequence number to a reference sequence number for a corresponding client independently of receiving the remaining fields of the message.

7. A communications interface in accordance with claim 3, wherein the parsing engine is arranged to generate the request format from a subset of data fields contained in a received message synchronously with reception.

8. A communications interface in accordance with claim 7, wherein the parsing engine is arranged to generate a compact client index for inclusion in the request format from a client sequence number included in a received message.

9. A communications interface in accordance with claim 7, wherein the parsing engine is arranged to generate an ephemeral instrument index for inclusion in the request format from an instrument code included in a received message.

10. A communications interface in accordance with claim 7, wherein the parsing engine is arranged to extract a price, quantity and client reference from received messages for inclusion in the request format.

11. A message verification process for an automated trading system, the process implemented on a physical layer interface in dedicated hardware and comprising:
   receiving messages from a plurality of client systems on an external network into the dedicated hardware of the physical layer interface that directly connects the automated trading system to the external network, each of the messages comprising a plurality of message fields; and
   verifying a plurality of the message fields for each of the messages in a validation engine implemented on the dedicated hardware of the physical layer interface, the verifying steps occurring synchronously with reception of the corresponding message fields and independently of receiving the entire message by comparing the message fields to a reference as they are received.

12. The process of claim 11 comprising generating notification messages for transmission to client systems in a dedicated hardware notification engine, the notification messages being generated from transaction information received from a matching engine in the automated trading system.

13. The process of claim 12 comprising receiving transaction information from the matching engine and generating notification messages for transmission to client systems synchronously with network transmission.

14. The process of claim 11 comprising verifying a message sequence number synchronously with reception of a sequence number field for new messages, the sequence number of new messages being compared to a reference sequence number for a corresponding client independently of receiving the remaining fields of the message.

15. The process of claim 14 comprising withholding received messages from the matching engine when the client sequence number and the reference sequence number for a corresponding client do not match.

16. The process of claim 11 comprising converting received messages into a request format for transmission to the matching engine in a dedicated hardware parsing engine, the request format condensing data from the received messages into a compact form.

17. The process of claim 16 comprising generating a compact client index for inclusion in the request format from a client sequence number included in a received message.

18. The process of claim 16 comprising generating an ephemeral instrument index for inclusion in the request format from an instrument code included in a received message.

19. The process of claim 16 comprising extracting a price, quantity and client reference from received messages for inclusion in the request format.

20. The process of claim 16 comprising incrementing a reference sequence number maintained by the validation engine for a client when a message received from the client is verified.

21. A communications interface for an Automated Trading System comprising:
   a physical layer interface arranged for communication of messages to and from a plurality of client systems through an external network, the physical layer interface comprising dedicated hardware and being arranged to receive messages directly from the external network, each of the received messages comprising a plurality of message fields,
   a parsing and validation engine implemented in the dedicated hardware and arranged to verify a plurality of the message fields contained in each of the messages synchronously with reception of the corresponding message fields, the parsing and validation engine being arranged to verify the message fields independently of receiving the entire message; and
   a notification engine implemented in the dedicated hardware and arranged to receive transaction information from a matching engine in the automated trading system and generate notification messages for transmission to client systems.

22. A communications interface in accordance with claim 21, wherein the notification engine is arranged to receive transaction information and compose outgoing messages synchronously with network transmission.

* * * * *